United States Patent
Chan (10) Patent No.: US 10,345,979 B2
(45) Date of Patent: Jul. 9, 2019

(54) DOUBLE-LAYER MUTUAL CAPACITIVE TOUCH PANEL

(71) Applicant: ILI TECHNOLOGY CORP., Hsinchu County (TW)

(72) Inventor: Ping-Yu Chan, Hsinchu County (TW)

(73) Assignee: ILI TECHNOLOGY CORP., Hsinchu County (TW)

( * ) Notice: Subject to any disclaimer, the term of this patent is extended or adjusted under 35 U.S.C. 154(b) by 0 days.

(21) Appl. No.: 15/871,205

(22) Filed: Jan. 15, 2018

(65) Prior Publication Data

US 2018/0210577 A1   Jul. 26, 2018

(30) Foreign Application Priority Data

Jan. 26, 2017   (TW) .............................. 106103157 A (51) Int. Cl.
  *G06F 3/044* (2006.01)
(52) U.S. Cl.
  CPC .... *G06F 3/044* (2013.01); *G06F 2203/04112* (2013.01)
(58) Field of Classification Search
  CPC .................. G06F 3/044; G06F 3/0416; G06F 2203/04111; G06F 3/0412
  See application file for complete search history.

(56) References Cited

U.S. PATENT DOCUMENTS

2018/0039372 A1*   2/2018   Cho ..................... G06F 3/0416

FOREIGN PATENT DOCUMENTS

| CN | 103902118 | 7/2014 |
| CN | 105573554 | 5/2016 |

* cited by examiner

*Primary Examiner* — Gerald Johnson
(74) *Attorney, Agent, or Firm* — JCIPRNET (57) ABSTRACT

A double-layer mutual capacitive touch panel includes a first conductive layer and a second conductive layer. The first conductive layer includes multiple electrodes arranged in an array. In each column of the array, the electrodes at the $((N*M)-1)^{th}$ row are mutually electrically connected to form a first electrodes series, and the electrodes at the $(N*M)^{th}$ row are mutually electrically connected to form a second electrode series, where N is a positive integer greater than or equal to 2 and M is a positive integer greater than or equal to 1. The second conductive layer includes M mutually insulated electrode strip groups sequentially arranged along a column direction of the array. Each electrode strip group includes N electrode strips mutually electrically connected, and each electrode strip of each electrode strip group extends along a row direction of the array and overlaps the electrodes of the corresponding row.

14 Claims, 8 Drawing Sheets

DOUBLE-LAYER MUTUAL CAPACITIVE TOUCH PANEL

This application claims the benefit of Taiwan application Serial No. 106103157, filed Jan. 26, 2017, the subject matter of which is incorporated herein by reference.

BACKGROUND OF THE INVENTION

Field of the Invention

The invention relates to a mutual capacitive touch panel, and more particularly, to a double-layer mutual capacitive touch panel having a double-layer electrode structure.

Description of the Related Art

With the progress of technologies, touch devices formed by displays and touch panels, capable of concurrently achieving touch control and display functions to provide human-machine interactions, are extensively applied in electronic products including smart phones, GPS navigator systems, tablet computers and laptop computers. Among various types of touch panels, mutual capacitive touch panels featuring advantages of high accuracy, multi-point touch control, high durability and a high touch control resolution have become one mainstream touch control technology in the industry.

Figure 1:
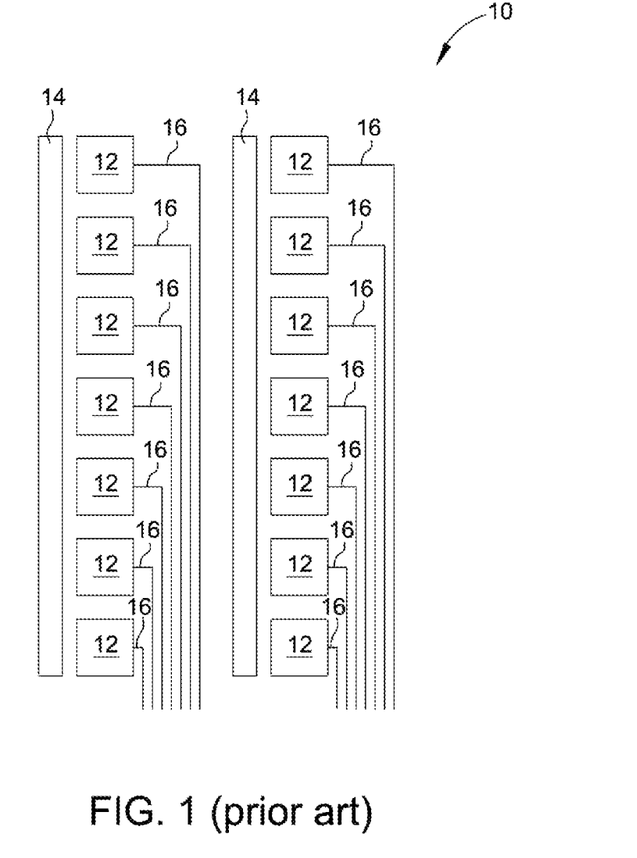
FIG. 1 (prior art) is a top view of a conventional mutual capacitive touch panel having a single-layer electrode structure.

The mutual capacitive touch control technology primarily determines a touch control event through detecting a coupling capacitance change generated by static electricity on a touching object and touch control units on a touch panel, when the touching object approaches or touches the touch control units. The mutual capacitive touch control technology, in the aspect of structural design, is mainly categorized into two types—single-layer electrode structures and double-layer electrode structures. FIG. 1 shows a top view of a conventional mutual capacitive touch panel having a single-layer electrode structure. As shown in FIG. 1, driving electrodes 12 and sensing electrodes 14 of a conventional touch panel 10 having a single-layer structure form one single electrode layer, and the overall thickness of the touch panel 10 can be reduced as a result. Further, each of the sensing electrodes 14 is shaped as a long strip, is disposed correspondingly to multiple driving electrodes 14, and generates coupling capacitance with each driving electrode 14 to individually serve as one touch control unit. However, in order to electrically connect the individual driving electrodes 12 to pads at the border, there must be a conductive wire 16 between every two adjacent sensing electrodes 14 to electrically connect to each driving electrode 12, such that the distance between the adjacent sensing electrodes 14 cannot be reduced due to the configuration of the conductive wires 16, further limiting distances between the touch control units and a distribution density of the touch control units (i.e., a resolution of the touch panel). Moreover, when the touch panel 10 having a single-layer electrode structure is disposed on a display, the sensing electrodes 14 are entirely exposed to the display, such that the sensing electrodes 14 may easily receive noise from the display and a poor sensitivity of touch control positioning is resulted.

Figure 2:
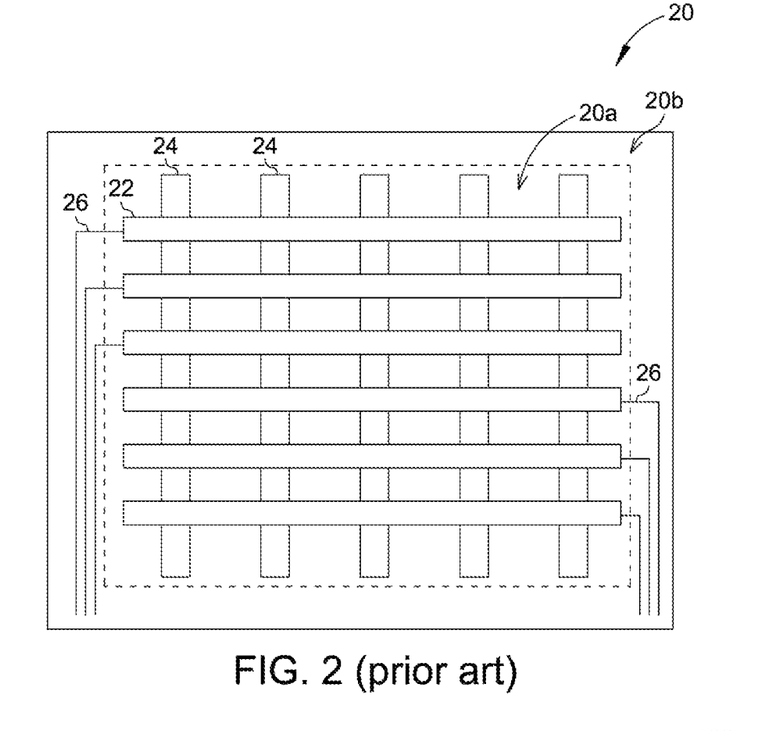
FIG. 2 (prior art) is a top view of a conventional mutual capacitive touch panel having a double-layer electrode structure.

FIG. 2 shows a top view of a conventional mutual capacitive touch panel having a double-layer electrode structure. As shown in FIG. 2, sensing electrodes 22 and driving electrodes 24 of a touch panel 20 are individually shaped as strips and mutually intersect to form touch control units. Further, the driving electrodes 24 are disposed between the sensing electrodes 22 and a display to block noise from the display. In addition, because the sensing electrodes 22 and the driving electrodes 24 in the double-layer electrode structure mutually intersect, there are no conductive wires between the sensing electrodes 22 or between the driving electrodes 24, thus increasing the distribution density of touch control units as well as simplifying a design pattern to lower manufacturing complexities. In addition, it is easier to design algorithms of a touch control chip for controlling the touch panel 20 having a double-layer electrode structure than that having a single-layer electrode structure. Thus, the double-layer electrode structure is commonly applied in intermediate to advanced consumer electronic products. However, in a conventional double-layer electrode structure, conductive wires 26 for electrically connecting the sensing electrodes 22 to pads are disposed in border regions 20b on two sides of a touch region 20a, in a way that the ranges of the border regions 20b are limited by the number of the conductive wires 26 and cannot be reduced.

SUMMARY OF THE INVENTION

The invention is directed to a double-layer mutual capacitive touch panel having fewer conductive wires, so as to decrease the number of conductive wires and further reduce widths of border regions on two sides of a touch region.

According to an embodiment of the present invention, a double-layer mutual capacitive touch panel has a touch region and a border region, and includes a first conductive layer, a second conductive layer and an insulation layer. The first conductive layer includes a plurality of electrodes arranged in an array and located in the touch region. In each column of the array, the electrodes at the $((N*M)-1)^{th}$ row are mutually electrically connected to form a first electrode series, and the electrodes at the $(N*M)^{th}$ row are mutually electrically connected to form a second electrode series, where N is a positive integer greater than or equal to 2 and M is a positive integer greater than or equal to 1. The second conductive layer is disposed on the first conductive layer, and includes M mutually insulated electrode strip groups sequentially arranged in the touch region and along a column direction of the array. Each of the electrode strip groups includes N mutually electrically connected electrode strips, and each electrode strip of each electrode strip group extends along a row direction of the array and overlaps the electrodes of the one corresponding column. The insulation layer is disposed between the first conductive layer and the second conductive layer.

In the double-layer mutual capacitive touch panel of the present invention, the same electrode strip group and at least one first electrode series and the second electrode series of the same column generate capacitance coupling to form at least two different touch control units, and the electrode strips of each of the electrode strip groups are mutually electrically connected. As such, one electrode strip group may be regarded as one sensing electrode, and the at least two touch control units need only one second conductive wire to transmit a sensing signal to a second pad. Therefore, the number of second conductive wires required by the double-layer mutual capacitive touch panel of the present invention is decreased by a half compared to that of a conventional double-layer mutual capacitive touch panel, further reducing the width of the border region for disposing the second conductive layers.

The above and other aspects of the invention will become better understood with regard to the following detailed description of the preferred but non-limiting embodiments. The following description is made with reference to the accompanying drawings.

DETAILED DESCRIPTION OF THE INVENTION

Figure 3:
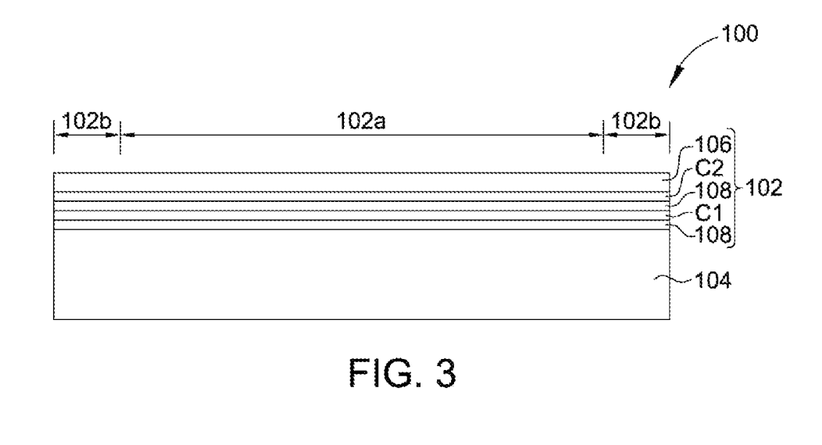
FIG. 3 is a section view of a touch display apparatus according to an embodiment of the present invention.

FIG. 3 shows a section view of a touch display apparatus according to an embodiment of the present invention. As shown in FIG. 3, a touch display apparatus 100 of this embodiment includes a double-layer mutual capacitive touch panel 102 and a display panel 104. The double-layer mutual capacitive touch panel 102 may be disposed on the display panel 104, and has a touch region 102a and a border region 102b. The touch region 102a includes driving electrodes and sensing electrodes, and the border region 102b includes connecting lines. In this embodiment, the border region 102b may be, for example but not limited to, surrounding the touch region 102a. Further, the double-layer mutual capacitive touch panel 102 may include a first conductive layer C1 and a second conductive layer C2 cascadingly disposed on a display surface, and the first conductive layer C1 and the second conductive layer C2 may be mutually insulated via an insulation layer disposed therebetween. In this embodiment, the double-layer mutual capacitive touch panel 102 may further include a substrate 106 and two thin films 108. The first conductive layer C1 and the second conductive layer C2 may be formed on the thin films 108, respectively. Using two adhesion layers, the substrate 106 is adhered to the thin film 108 provided with the second conductive layer C2, and the thin film 108 provided with the first conductive layer C1 is adhered to the thin film 108 provided with the second conductive layer C2, forming the double-layer mutual capacitive touch panel 102. The double-layer mutual capacitive touch panel 102 may be adhered to the display surface through the adhesion layer, so as to have the first conductive layer C1 and the second conductive layer C2 be disposed between the substrate 106 and the display panel 104. The thin film 108 between the first conductive layer C1 and the second conductive layer C2 may serve as an insulation layer to electrically insulate the two. Preferably, the first conductive layer C1, closer to the display panel, may include driving electrodes for transmitting driving signals, and the second conductive layer C2, closer to the touching object, may include sensing electrodes for generating sensing signals. Thus, the driving electrodes can be used to block effects of the display panel on the sensing electrodes in addition to transmitting driving signals. The double-layer mutual capacitive touch panel 102 of the present invention is not limited to the above. In another embodiment, the first conductive layer C1 and the second conductive layer C2 may be cascadingly and directly formed on the substrate 106, and an insulation layer is formed between the first conductive layer C1 and the second conductive layer C2 to electrically insulate the two. In another embodiment, the first conductive layer C1 and the second conductive layer C2 may also be directly formed on the display surface of the display panel 104, e.g., on a color filter substrate of an LCD panel or a packaging cover plate of an OLED panel. Further, the substrate 106 may include hard substrates or flexible substrate, e.g., glass substrates, tempered glass substrate, quartz substrates, sapphire substrates, hard cover lenses, plastic substrates, flexible cover plates, flexible plastic substrates or thin glass substrates.

Figure 4:
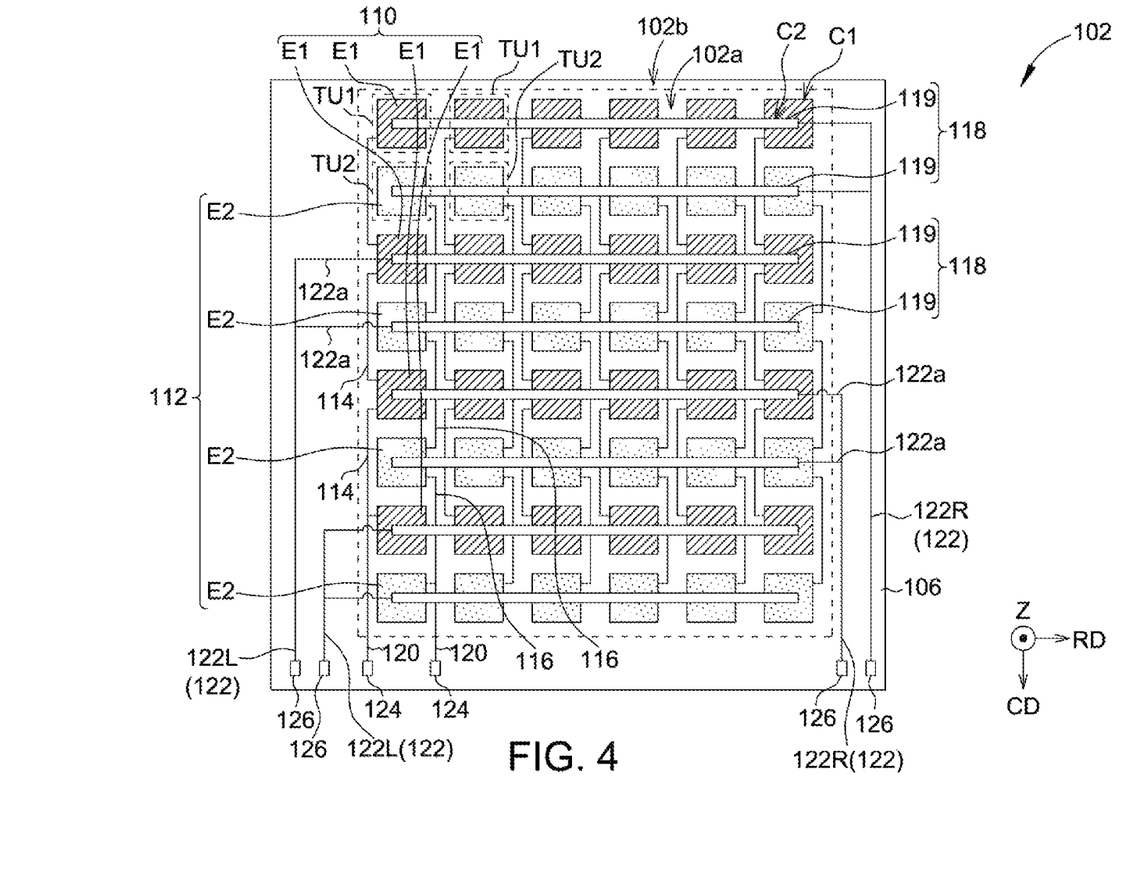
FIG. 4 is a top view of a double-layer mutual capacitive touch panel according to a first embodiment of the present invention.

The first conductive layer C1 includes a plurality of electrodes arranged in an array and located in the touch region 102a. In each column of the array, the electrodes at the $((N*M)-1)^{th}$ row are mutually electrically connected to form a first electrode series, and the electrodes at the $(N*m)^{th}$ row are mutually electrically connected to form a second electrode series, where N is a positive integer greater than or equal to 2 and M is a positive integer greater than or equal to 1. FIG. 4 shows a top view of a double-layer mutual capacitive touch panel according to a first embodiment of the present invention. For illustration purposes, the thin films 108 are omitted in FIG. 4, but the present invention is not limited thereto. As shown in FIG. 4, N is equal to 2 in this embodiment, thereby in each column of the array, electrodes E1 at odd rows (i.e., the $(2*M-1)^{th}$ rows) are mutually electrically connected to form a first electrode series 110, and electrodes E2 at even rows (i.e., the $(2*M)^{th}$ rows) are mutually electrically connected to form a second electrode series 112. The first electrode series 110 and the second electrode series 112 are mutually insulated, and any two adjacent electrodes E1 or E2 at the same row but different columns are mutually separated and insulated such that the first electrode series 110 at different columns or the second electrode series 112 at different columns are mutually insulated. More specifically, the first conductive layer C1 may further include a plurality of first connecting segments 114 and a plurality of second connecting segments 116. Each of the first connecting segments 114 connects two adjacent electrodes E1 in each of the first electrode series 110 (i.e., two adjacent electrodes E1 at the same column but different odd rows), and each of the second connecting segments 116 connects two adjacent electrodes E2 in each of the second electrode series 112 (i.e., two adjacent electrodes E2 at the same column but different even rows). In this embodiment, the first connecting segments 114 and the second connecting segments 116 corresponding to the electrodes E1 and E2 at the same column are respectively disposed on two sides of the electrodes E1 and E2 at the same column, e.g., respectively disposed on the left or right sides, or vice versa, thus alternatingly arranging the first connecting segments 114 and the second connecting segments 116 to prevent electrical connection. More specifically, the electrodes E1 and E2 at the same column are overlapping and aligned in a column direction CD of the array. Further, the first connecting segments 114, in the column direction CD of the array, do not overlap the electrodes E1 of the corresponding first electrode series 110, and the second connecting segments 116, in the column direction CD of the array, do not overlap the electrodes E2 of the corresponding second electrode series 112.

Further, the second conductive layer C2 includes a plurality of mutually insulated electrode strip groups 118 arranged sequentially along the column direction CD of the array, and each of the electrode strip groups 118 includes two electrode strips 119 mutually electrically connected. Each of the electrode strips 119 of each electrode strip group 118 extends along a row direction RD of the array, and overlaps, in a perpendicular projection direction Z, the electrodes E1 or E2 at the corresponding row. Thus, the electrode strip 119 corresponding to the electrodes E1 at the same row may generate capacitive coupling with each of these electrodes E1 to form a touch control unit TU1, and the electrode strip 119 corresponding to the electrodes E2 at the same row may generate capacitance coupling with each of these electrodes E2 to form a touch control unit TU2 for detecting a position of the touching object. Because two electrode strips 119 of the same electrode strip group 118 are adjacent to each other, the two electrode strips 119 may respectively overlap the electrodes E1 and E2 of two adjacent rows, i.e., respectively generating capacitance coupling with the first electrode series 110 and the second electrode series 112. Thus, the same electrode strip group 118 may form, with the first electrode series 110 and the second electrode series 112 at the same column, two different touch control units TU1 and TU2. In this embodiment, each of the electrode strips 119 may be shaped as, for example but not limited to, a long strip, or may be in other shapes. Further, widths of the electrodes E1 and E2 in the column direction CD of the array may be greater than widths of the electrode strips 119 in the column direction CD of the array. As such, the electrodes E1 and E2 can effectively block and shield the effects that the display has on the electrode strips 119, thereby enhancing the touch control accuracy of the double-layer mutual capacitive touch panel 102.

In this embodiment, the double-layer mutual capacitive touch panel 102 may further include a plurality of first conductive wires 120 and a plurality of second conductive wires 122 disposed on the substrate 106 in the border region 102b. The first conductive wires 120 are electrically connected to the first electrode series 110 and the second electrode series 112, respectively, and the second conductive wires 112 are electrically connected to the electrode strips 119 of the electrode strip groups 118, respectively. More specifically, the first conductive wires 120 and the second conductive wires 122 may be made of silver or a transparent conductive material. The first conductive wires 120 may extend from the border region 102b to the touch region 102a to connect to the corresponding first connecting segments 114 or second connecting segments 116. The first conductive wires 120 and the electrodes E1 and E2 may be formed by the same first conductive layer C1 or be formed by different conductive layers. Each of the second conductive wires 122 may include two branches 122a, which are respectively connected to the electrode strips 119 of the same electrode strip group 118. The second conductive wires 122 and the electrode strips 119 may be formed by the same second conductive layer C2 or be formed by different conductive layers. The double-layer mutual capacitive touch panel 102 may further include a plurality of first pads 124 and a plurality of second pads 126 disposed on the substrate 106 in the border region 102b on the same side of the touch region 102a. More specifically, the first pads 124 and the second pads 126 may be, for example but not limited to, respectively disposed on different thin films 108. The first pads 124 are electrically connected to the first conductive wires 120, respectively, and the second pads 126 are electrically connected to the second conductive wires 122, respectively. As such, the electrode strip group 118 may be electrically connected to an external control chip via the first pads 124, and the first electrode series 110 and the second electrode series 112 may be electrically connected to the external control chip via the second pads 126. Further, the second conductive wires 122 may be divided into left conductive wires 122L and right conductive wires 122R, which are respectively disposed on two sides of the touch region 102a and extend to the other side of the touch region 102b to be connected to the second pads 126. It should be noted that, the second conductive wires 122 of this embodiment, in addition to connecting the same electrode strip group 118 to the second pads 126, are capable of further electrically connecting the electrode strips 119 of the same electrode strip group 118, such that the electrode strips 119 of the same electrode strip group 118 may be electrically connected in the border region 102b. It should be noted that the present invention is not limited to the above electrical connection. In another embodiment, the electrode strips 119 of each electrode strip group 118 may also be electrically connected in the touch region 102a. For example, the double-layer mutual capacitive touch panel 102 may further include a plurality of connecting segments disposed in the touch region 102a, and the connecting segments are respectively placed between the electrode strips 119 of each of the electrode strip groups 118 to connect the electrode strips 119. The connecting segments and the electrode strips 119 may be formed by the same second conductive layer C2 or be formed by different conductive layers.

Further, the first electrode series 110 and the second electrode series 112 may serve as different driving electrodes for individually transmitting a driving signal. The electrode strips 119 of each of the electrode strip groups 118 are mutually electrically connected, thereby one electrode strip group 118 may be regarded as one sensing electrode for generating a corresponding sensing signal due to capacitance coupling when the corresponding electrode E1 or E2 receives the driving signal. For one electrode strip group 118, when touch control is performed, the control chip transmits a driving signal to each of the first electrode series 110 and the second electrode series 112, and the electrode strip group 118 may generate a corresponding sensing signal for the driving signal corresponding to each of the first electrode series 110 and the second electrode series 112. Thus, one electrode strip group 118 may generate two sensing signals respectively for two different driving signals or two same driving signals at different time points, achieving detection by means of the two touch control units TU1 and TU2. One person skilled in the art can understand that, this operation characteristic may be applied to all embodiments of the present invention, and associated details are omitted hereafter. With the configuration of the same electrode strip group 118 generating capacitance coupling with the first electrode series 110 and the second electrode series 112 at the same column forming two different touch control units TU1 and TU2, the two touch control units TU1 and TU2 need only one second conductive wire 122 for transmitting the sensing signal to the second pad 126. Therefore, compared to the conventional double-layer mutual capacitive touch panel in FIG. 2, the number of second conductive wires 122 required by the double-layer mutual capacitive touch panel 102 can be decreased by a half, further reducing the width of the border region 102b in which the second conductive wires 122 are provided. Taking the double-layer mutual capacitive touch panel 102 having 28*17 touch units as an example, there are 28 touch control units TU1 and TU2 in each column, and 17 touch control units TU1 and TU2 in each row. In this embodiment, the double-layer mutual capacitive touch panel 102 needs 17 first electrodes series 110 and 17 second electrode series 112 but only 14 electrode strip groups 118. That is to say, only 14 second conductive wires 122 connecting the electrode strip groups 118 are needed. Further, the second conductive wires 122 may be placed in the border region 102b on the two sides of the touch region 102a, and so only 7 second conductive wires 122 need to be provided in the border region 102b on each side. Assuming that the width of the second conductive wires 122 is 0.1 mm and a distance between two adjacent conductive wires is 0.05 mm, the width of the border region 102b on each side is only 1.05 mm. In contrast, in a conventional double-layer mutual capacitive touch panel, one sensing electrode and one driving electrode generate capacitive coupling to form only one touch control unit, thereby 28 conductive wires for connecting sensing electrodes are needed, leading to a width of 0.1*14+0.05*14=2.1 mm of the border region 102b on each side. Clearly, the double-layer mutual capacitive touch panel 102 of the embodiment effectively reduces the widths of the border region 102b on left and right sides of the touch region 102a. When the row direction RD of the touch panel 102 is the horizontal direction for a display image of the display panel, the frame of the touch display apparatus 100 applied is not restricted by a total width of the second conductive wires and may be further reduced. Particularly, when the touch display apparatus 100 is applied to a smart phone, the frame at left and right sides can be reduced to achieve an almost frame-less appearance, thus increasing the size of the display image without changing the dimensions of the smart phone.

The double-layer mutual capacitive touch panel of the present invention is not limited to the above embodiment. In the first conductive layer, each column of the array is not limited to including the first electrode series at odd rows and second electrode series at even rows. More specifically, in each column of the array of the present invention, at least the first electrode series formed by the mutually electrically connected electrodes at $((N*M)-1)^{th}$ rows, and the second electrode series formed by the mutually electrically connected electrodes at the $(N*M)^{th}$ rows are included, where N is a positive integer greater than or equal to 2, and M is a positive integer greater than or equal to 1. With respect to the first embodiment, N is equal to 2, but the present invention is not limited thereto. To better compare difference between the first embodiment and its variations as well as other embodiments and to keep the description simple, the same components in other variations and other embodiments are represented by the same denotations, and only the differences between the first embodiment and its variations and differences between the first embodiments and other embodiments are described, with the repeated parts omitted.

Figure 5:
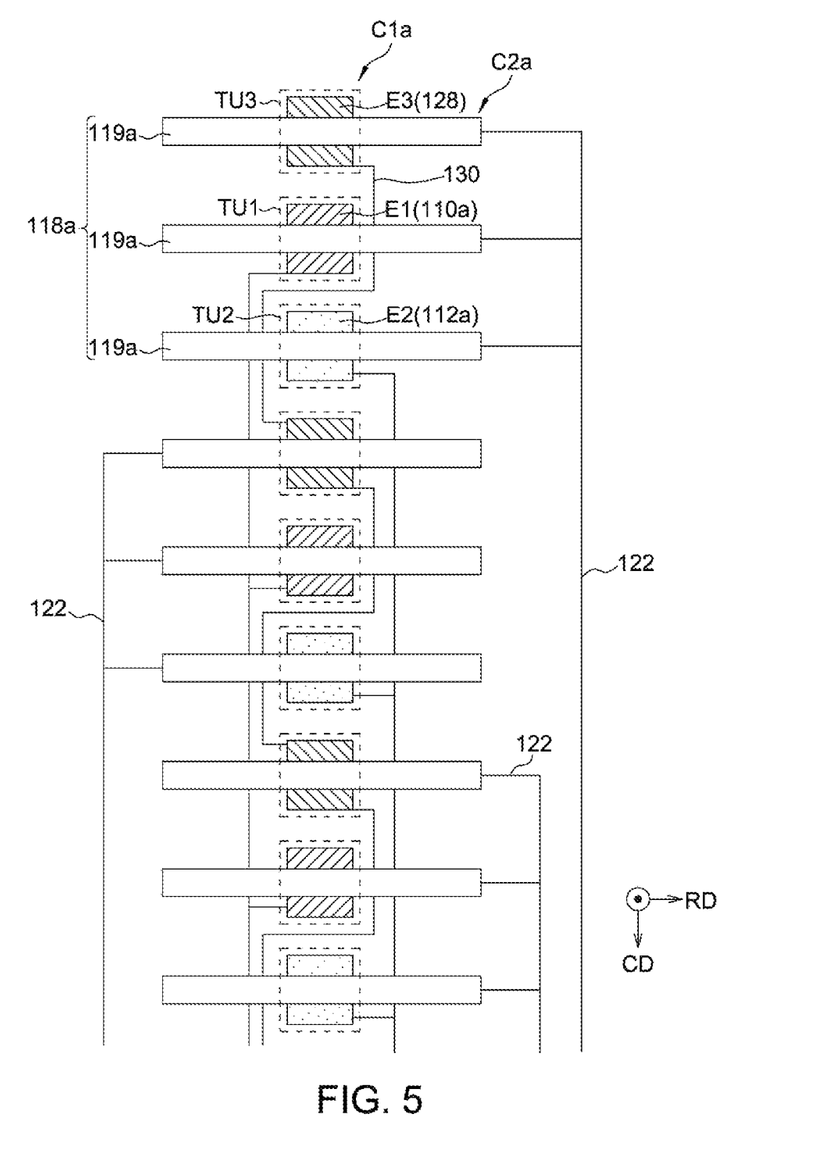
FIG. 5 is a top view of a double-layer mutual capacitive touch panel according to a variation of the first embodiment of the present invention.

In a variation of the first embodiment, as shown in FIG. 5, when N is equal to 3, in addition to the first electrode series 110 and the second electrode series 112, each column of the array further includes a third electrode series 128. To keep the drawing clear, only one column is depicted in FIG. 5, but the present invention is not limited thereto. Compared to the first embodiment, in a first conductive layer C1a of this variation of the first embodiment, the electrodes E1 at the $(3*M-1)^{th}$ rows are mutually electrically connected to form a first electrode series 110a, and the electrodes E2 at the $(3*M)^{th}$ rows are mutually electrically connected to form a second electrode series 112a, and the electrodes E3 at the $(3*M-2)^{th}$ rows are mutually electrically connected to form the third electrode series 128. The first electrode series 110a, the second electrode series 112a and the third electrode series 128 are insulated from one another. The first conductive wires 120 are electrically connected to the first electrode series 110a, the second electrode series 112a and the third electrode series 128, respectively. The first conductive layer C1a may further include a plurality of third connecting segments 130 individually connecting between two adjacent electrodes E3 at the same column. To mutually electrically connect the two adjacent electrodes E3 at the same column, a part of the individual third connecting segments 130 is placed between two adjacent electrodes E1 and E2. Correspondingly, the second conductive layer C2a includes M mutually insulated electrode strip groups 118a sequentially arranged along the column direction of the array in the touch region 102a. Each of the electrode strip groups 118a includes N mutually electrically connected electrode strips 119a, and each of the electrode strips 119a in each electrode strip group 118a extends along the row direction of the array and overlaps the electrodes E1, E2 or E3 of the corresponding row in a perpendicular projection direction Z. The second conductive wires 122 are electrically connected to the electrode strips 119a of each of the electrode strip groups 118a, respectively. The electrode strip 119a corresponding to the electrodes at the same row E1 may generate capacitance coupling with each of these electrodes E1 and form a touch control unit TU1, the electrode strip 119a corresponding to the electrodes E2 at the same row may generate capacitance coupling with each of these electrodes E2 and form a touch control unit TU2, and the electrode strip 119a corresponding to the electrodes E3 at the same row may generate capacitance coupling with each of these electrodes E3 and form a touch control unit TU3. Since the three touch control units TU1, TU2 and TU3 of this variation of the first embodiment need only one second conductive wire 122 for transmitting the sensing signal, the number of the second conductive wires 122 required by the double-layer mutual capacitive touch panel in this variation is decreased compared to that in the conventional double-layer mutual capacitive touch panel in FIG. 2 and is also less than that in the first embodiment, thereby further effectively reducing the width for disposing the second conductive wires 122 in the border region. Similarly, N in the present invention may also be set to a positive integer greater than 4 so as to reduce the width of the border region.

Figure 6:
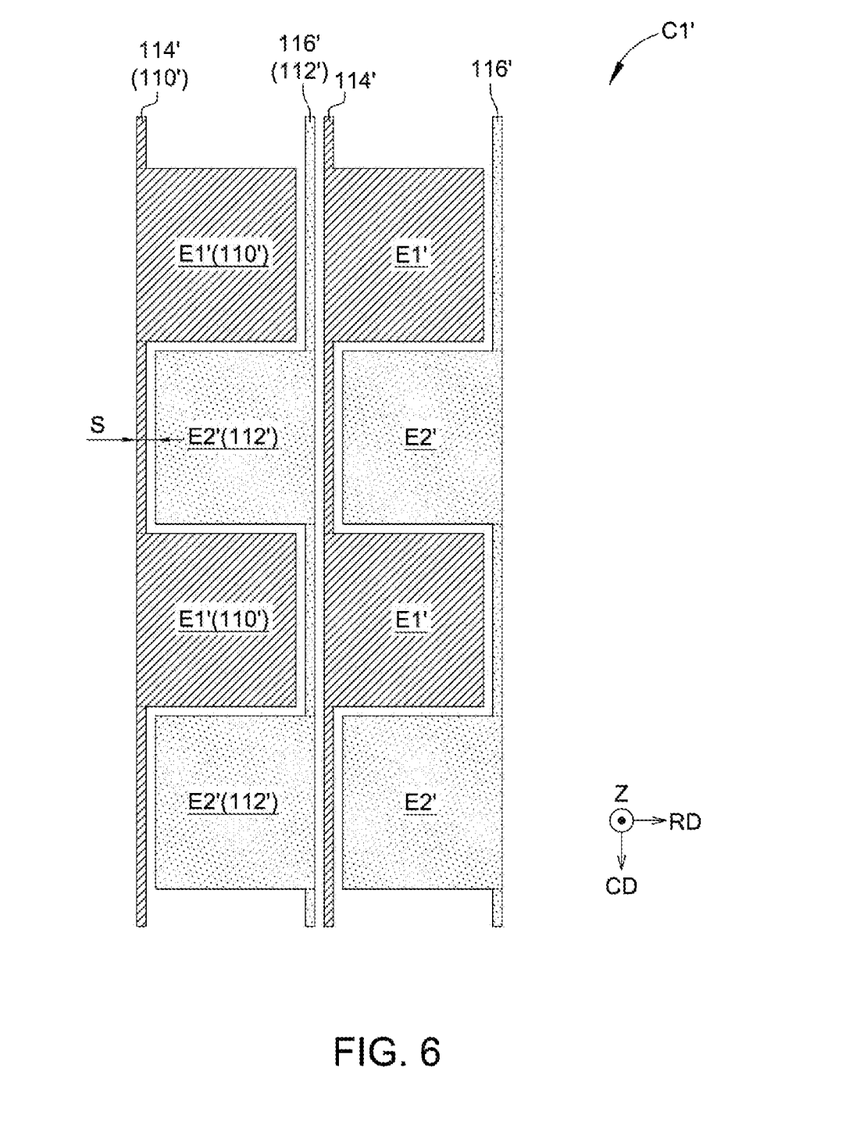
FIG. 6 is a top view of a first conductive layer according to a second embodiment of the present invention.
Figure 7:
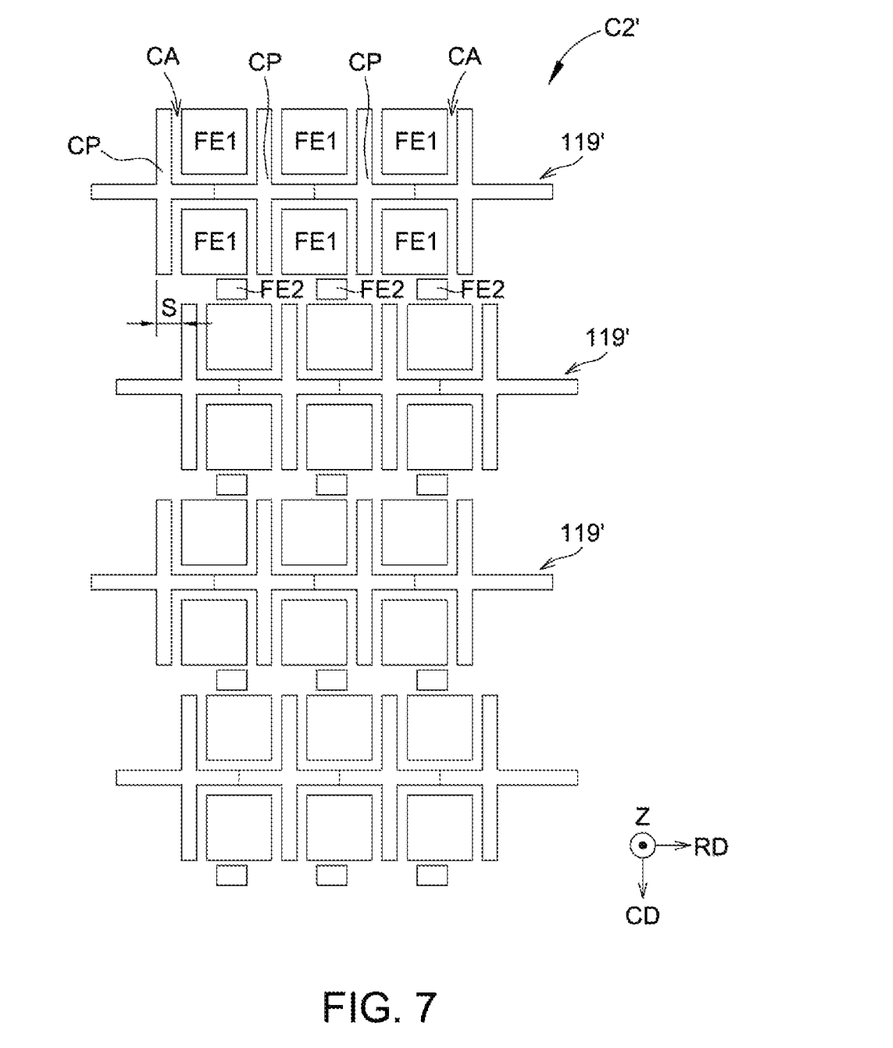
FIG. 7 is a top view of a second conductive layer according to the second embodiment of the present invention.
Figure 8:
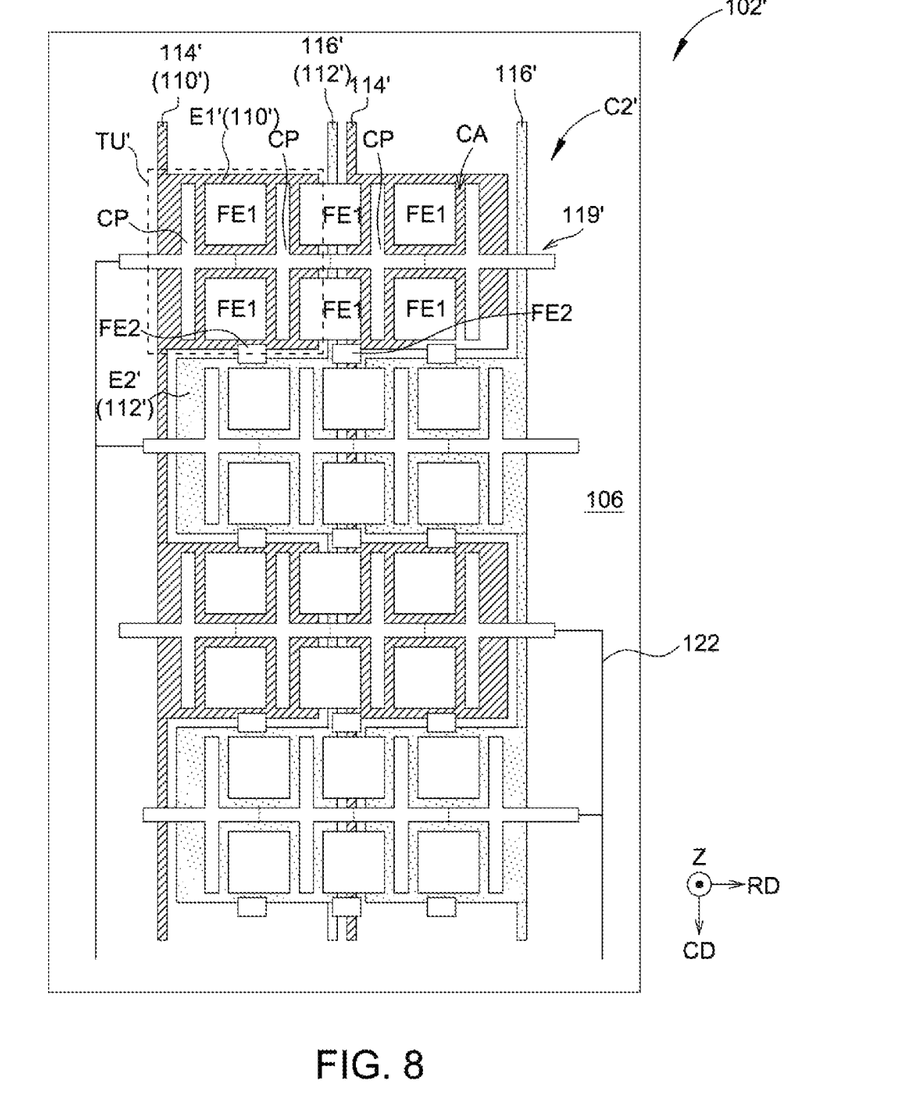
FIG. 8 is a top view of a double-layer mutual capacitive touch panel according to the second embodiment of the present invention.

The double-layer mutual capacitive touch panel of the present invention further includes other embodiments. Refer to FIG. 6 to FIG. 8. FIG. 6 shows a top view of a first conductive layer according to a second embodiment of the present invention. FIG. 7 shows a top view of a second conductive layer according to the second embodiment of the present invention. FIG. 8 shows a top view of a double-layer mutual capacitive touch panel according to the second embodiment of the present invention. To better show the patterns of the first conductive layer and the second conductive layer, only a 4*2 array is depicted in FIG. 6, and the pattern of a second conductive layer corresponding to a 4*2 array is further depicted in FIG. 7. It should be noted that the present invention is not limited to the above examples. As shown in FIG. 6, compared to the first embodiment, first connecting segments 114' of a first conductive layer C1' of this embodiment overlap, in the column direction CD of the array, electrodes E1' of a corresponding first electrode series 110', and second segments 116' overlap, in the column direction CD of the array, electrodes E2' of a corresponding second electrode series 112'. In this embodiment, the odd-row electrodes E1' and even-row electrodes E2' at the same column have a shift S in the column direction CD of the array, and the value of the shift is a sum of the width of the first connecting segments 114' and the distance between the odd-row electrodes E2' and the corresponding first connecting segments 114'. For example, compared to the odd-row electrodes D1', the even-row electrodes E2' may be shifted towards the right, and the first connecting segments 114' are respectively provided on the left side of the even-row electrodes E2', and the second connecting segments 116' are respectively provided on the right side of the odd-row electrodes E1'. It should be noted that the present invention is not limited to the above example. In another embodiment, the even-row electrodes E2' may also be shifted towards the left, and the first connecting segments 114' may be respectively provided on the right side of the even-row electrodes E2', and the second connecting segments 116' may be respectively provided on the left side of the odd-row electrodes E1'.

As shown in FIG. 7, compared to the first embodiment, each of the electrode strips 119' of this embodiment includes a plurality of cross-shaped portions CP connected in series along the row direction RD of the array to connect and form a trellis electrode strip. To corresponding to the electrodes E1' and E2' in the first conductive layer C1', any two adjacent electrode strips 119' also have a shift S in the column direction CD of the array. The second conductive layer C2' may further include a plurality of first floating electrodes FE1 and a plurality of second floating electrodes FE2. The first floating electrodes FE1 are individually disposed between any two adjacent and connected electrode strips 119', so as to increase the coupling capacitance between the touching object and the electrode strips 119' and the amount of sensing signals generated by the electrode strips 119'. More specifically, the trellis electrode strip 119' has a plurality of recesses CA, and the first floating electrodes FE1 are respectively disposed in the recesses CA. The second floating electrodes FE2 are located outside the recesses CA, and are individually disposed between two adjacent first floating electrodes FE1 between two adjacent electrode strips 119'.

As shown in FIG. 8, in this embodiment, the two cross-shaped portions of each electrode strip 119' may overlap one corresponding electrode E1' or E2' in the perpendicular projection direction Z, for example but not limited to. Because the shift S of any two adjacent electrode strips 119a in the column direction CD of the array is equal to the shift S of the odd-row and even-row electrodes E1' and E2' at the same column, the overlapping area of the electrode 119' with each electrode E1' or E2' is equal to that with another. It is known that, each touch control unit TU' has the same sensitivity, thus further enhancing the accuracy of the double-layer mutual capacitive touch panel 102' for detecting a linear motion of the touching object. Further, the widths of the electrodes E1' and E2' in the column direction CD of the array may also be greater than the width of the cross-shaped portions CP in the column direction CD of the array, so as to block the effect of the display on the electrode strips 119'. It should be noted that, the double-layer mutual capacitive touch panel 102' of this embodiment generates capacitance coupling using the cross-shaped portions CP and the corresponding electrodes E1' or E2', and so touch control is performed when the touching object is not in contact with the housing; i.e., for floating touch, the double-layer mutual capacitive touch panel 102' still provides good touch control accuracy.

In another embodiment, the odd-row electrodes E1' and the even-row electrodes E2' at the same column may not have a shift in the column direction CD of the array. In other words, the electrodes E1' and E2' at each column are aligned with one another in the column direction CD of the array. Further, the connecting segments 114' of this embodiment do not overlap, in the column direction CD of the array, the electrodes E1' of the corresponding first electrode series 110', and the second connecting segments 116' do not overlap, in the column direction CD of the array, the electrodes E2' of the corresponding second electrode series 112'.

Figure 9:
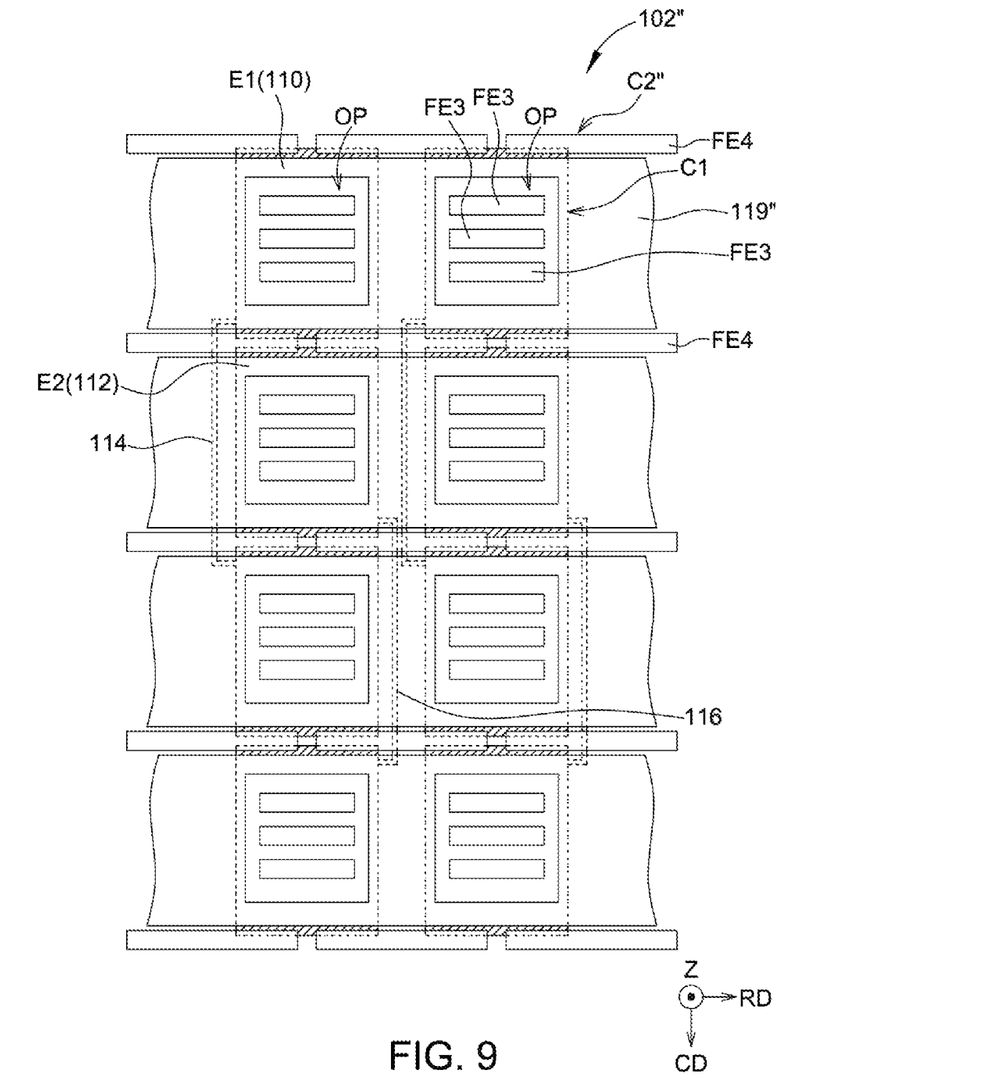
FIG. 9 is a top view of a double-layer mutual capacitive touch panel according to a third embodiment of the present invention.

FIG. 9 shows a top view of a double-layer mutual capacitive touch panel according to an embodiment of the present invention. As shown in FIG. 9, compared to the first embodiment, in the double-layer mutual capacitive touch panel of this embodiment, each electrode strip 119" may include a plurality of openings OP sequentially arranged along the row direction RD of the array. More specifically, each of the openings OP of each electrode strip 119" may overlap one corresponding electrode E1 or E2, so as to increase the amount of sensing capacitance change when the touching object approaches or touches the double-layer mutual capacitive touch panel 102" and to further enhance the touch control accuracy of the double-layer mutual capacitive touch panel 102". Moreover, a second conductive layer C2" of this embodiment may further include a plurality of third floating electrodes FE3, which are respectively disposed in the openings OP and are separated from the electrode strip 119". For example but not limited to, three third floating electrodes FE3 may be disposed in each opening OP. Further, the second conductive layer C2" may further include a plurality of fourth floating electrodes FE4 disposed between any two adjacent electrode strips 119" so as to increase the amount of touch sensing with respect to the touching object. In another embodiment, the odd-row electrodes E1" and the even-row electrodes E2" at the same column have a shift S in the column direction CD of the array, and any two adjacent electrode strips 119" also have the shift S in the column direction CD of the array, such that the openings OP of the two adjacent electrode strips 119" also have the shift S.

Same as the first embodiment, in the first conductive layer of the double-layer mutual capacitive touch panel of the second embodiment and the third embodiment, each column of the array is not limited to including the first electrode series formed by the odd-row electrodes and is not limited to including the second electrode series formed by the even-row electrodes. In each column of the array, the first electrode series formed by the mutually electrically connected electrodes at the $((N*M)-1)^{th}$ rows and the second electrode series formed by the mutually electrically connected electrodes at the $(N*M)^{th}$ rows are included, where N is a positive integer greater than or equal to 2 and M is a positive integer greater than or equal to 1. Further, the second conductive layer correspondingly includes M mutually insulated electrode strip groups, and each of the electrode strip groups includes N mutually electrically connected electrode strips. The remaining details are the same, and shall be omitted.

In conclusion, in the double-layer mutual capacitive touch panel of the present invention, the same electrode strip group and at least one first electrode series and the second electrode series generate capacitance coupling to form at least two different touch control units, and the electrode strips of each of the electrode strip groups are mutually electrically connected. As such, one electrode strip group may be regarded as one sensing electrode, and the at least two touch control units need only one second conductive wire to transmit the sensing signal to the second pad. Therefore, the number of second conductive wires required by the double-layer mutual capacitive touch panel of the present invention is decreased by a half compared to that of a conventional double-layer mutual capacitive touch panel, further reducing the width of the border region for disposing the second conductive layers and achieving an almost frame-less appearance for a smart phone to which the present invention is applied.

While the invention has been described by way of example and in terms of the preferred embodiments, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A double-layer mutual capacitive touch panel, having a touch region and a border region, comprising:
    a first conductive layer, comprising a plurality of electrodes arranged in an array and located in the touch region, in each column of the array, the electrodes at the $((N*M)-1)$th row mutually electrically connected to form a first electrode series, the electrodes at the $(N*M)$th mutually electrically connected to form a second electrode series, where N is a positive integer greater than or equal to 2 and M is a positive integer greater than or equal to 1;
    a second conductive layer, disposed on the first conductive layer, comprising M mutually insulated electrode strip groups sequentially arranged in the touch region along a column direction of the array, wherein each of the electrode strip groups comprises N mutually electrically connected electrode strips, and each of the electrode strips of each of the electrode strip groups extends along a row direction of the array and overlaps, in a perpendicular projection direction, the electrodes at one corresponding row; and
    an insulation layer, disposed between the first conductive layer and the second conductive layer,
    wherein widths of the plurality of electrodes in the column direction of the array are respectively greater than widths of the plurality of electrode strips in the column direction of the array.

2. The double-layer mutual capacitive touch panel according to claim 1, further comprising a plurality of conductive wires, which are disposed in the border region and are respectively electrically connected to the electrode strips of each of the electrode strip groups.

3. The double-layer mutual capacitive touch panel according to claim 1, wherein the first conductive layer further comprises a plurality of first connecting segments and a plurality of second connecting segments, each of the first connecting segments connects two adjacent of the electrodes in the corresponding first electrode series, and each of the second connecting segments connects two adjacent of the electrodes in the corresponding second electrode series.

4. The double-layer mutual capacitive touch panel according to claim 3, wherein the first connecting segments do not overlap, in the column direction of the array, the electrodes of the corresponding first electrode series, and the second connecting segments do not overlap, in the column direction of the array, the electrodes of the second electrode series.

5. The double-layer mutual capacitive touch panel according to claim 3, wherein the first connecting segments overlap, in the column direction of the array, the electrodes of the corresponding first electrode series, and the second connecting segments overlap, in the column direction of the array, the electrodes of the corresponding second electrode series.

6. The double-layer mutual capacitive touch panel according to claim wherein the electrodes at the $((N*M)-1)$th rows and the electrodes at the $(N*M)$th rows at the same column have a shift in the column direction of the array, and the electrode strips of each of the electrode strip groups have the shift in the column direction of the array.

7. The double-layer mutual capacitive touch panel according to claim 1, wherein each of the electrode strips comprises a plurality of cross-shaped portions sequentially connected in series along the row direction of the array.

8. The double-layer mutual capacitive touch panel according to claim 7, wherein every two cross-shaped portions of the electrode strips overlap one corresponding of the electrodes.

9. The double-layer mutual capacitive touch panel according to claim 7, wherein the second conductive layer further comprises a plurality of first floating electrodes individually disposed between any two adjacent of the cross-shaped portions that are connected to each other.

10. The double-layer mutual capacitive touch panel according to claim 7, wherein the second conductive layer further comprises a plurality of second floating electrodes disposed between any two adjacent of the electrode strips.

11. The double-layer mutual capacitive touch panel according to claim 1, wherein each of the electrode strips comprises a plurality of openings sequentially arranged along the row direction of the array.

12. The double-layer mutual capacitive touch panel according to claim 11, wherein each of the openings of each of the electrode strips overlaps one corresponding of the electrodes.

13. The double-layer mutual capacitive touch panel according to claim 11, wherein the second conductive layer further comprises a plurality of third floating electrodes respectively disposed in the openings.

14. The double-layer mutual capacitive touch panel according to claim 11, wherein the second conductive layer further comprises a plurality of fourth floating electrodes disposed between any two adjacent of the electrode strips.

* * * * *